(12) United States Patent
Morita

(10) Patent No.: US 9,173,249 B2
(45) Date of Patent: Oct. 27, 2015

(54) STEERING WHEEL

(75) Inventor: Bunpei Morita, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 473 days.

(21) Appl. No.: 13/598,989

(22) Filed: Aug. 30, 2012

(65) Prior Publication Data

US 2013/0062329 A1 Mar. 14, 2013

(30) Foreign Application Priority Data

Sep. 14, 2011 (JP) ................................. 2011-200913

(51) Int. Cl.
H05B 3/34 (2006.01)

(52) U.S. Cl.
CPC ............ *H05B 3/34* (2013.01); *H05B 2203/003* (2013.01); *H05B 2203/014* (2013.01)

(58) Field of Classification Search
CPC .... B62D 1/065; H05B 3/34; H05B 2203/014; H05B 2203/003; B62J 33/00; B62K 21/26
USPC ......... 219/204, 202, 528, 529, 544, 545, 546, 219/547, 548, 549, 550; 74/552–558; 156/292; 264/129; 280/777; 29/894.2
See application file for complete search history.

(56) References Cited

U.S. PATENT DOCUMENTS

| | | | | |
|---|---|---|---|---|
| 1,416,946 A * | 5/1922 | Cobus | ....................... | 237/12.3 R |
| 1,429,799 A * | 9/1922 | Tesdell | ........................... | 219/204 |
| 1,604,272 A * | 10/1926 | Gammeter | ................... | 264/46.7 |
| 3,270,581 A * | 9/1966 | Geller | .............................. | 74/552 |
| 3,802,291 A * | 4/1974 | Young et al. | .................... | 74/552 |
| 4,011,773 A * | 3/1977 | Muller et al. | ................... | 74/552 |
| 4,118,455 A * | 10/1978 | Byrn | .............................. | 264/129 |
| 4,631,976 A | 12/1986 | Noda et al. | | |
| 4,753,129 A * | 6/1988 | Ishida et al. | .................... | 74/552 |
| 4,811,472 A * | 3/1989 | Kobayashi | .................. | 29/894.2 |
| 4,946,194 A * | 8/1990 | Maeda et al. | ................. | 280/777 |

(Continued)

FOREIGN PATENT DOCUMENTS

| | | | |
|---|---|---|---|
| JP | S61-081273 A | 4/1986 |
| JP | S61-143965 U | 9/1986 |

(Continued)

OTHER PUBLICATIONS

Office action dated Mar. 11, 2014 in the corresponding JP application No. 2011-200913.

*Primary Examiner* — Dana Ross
*Assistant Examiner* — Gyounghyun Bae
(74) *Attorney, Agent, or Firm* — Posz Law Group, PLC

(57) ABSTRACT

A steering wheel having a rim portion is provided. The rim portion includes a rim metal core, at least one heating element, which extends around the core, and a coating portion, which coats the heating element. The heating element includes a heat generating member for generating heat when electrified, a heat transfer sheet, and a flexible heat insulating sheet. The heat transfer sheet transfers heat of the heat generating member to the coating portion. The heat insulating sheet hinders heat of the heat generating member from being transferred to the core. The heat insulating sheet has first and second surfaces. The heat transfer sheet is laid on the first surface. The heat generating member is located between the first surface and the heat transfer sheet. The heating element is affixed to the core at the second surface, while being flexed to conform to the surface of the core.

7 Claims, 5 Drawing Sheets

(56) References Cited

U.S. PATENT DOCUMENTS

| | | | |
|---|---|---|---|
| 6,392,195 B1 | 5/2002 | Zhao et al. | |
| 6,478,330 B2* | 11/2002 | Fujita | 280/731 |
| 6,495,799 B1* | 12/2002 | Pillsbury et al. | 219/204 |
| 6,651,526 B1* | 11/2003 | Imaizumi et al. | 74/552 |
| 7,895,917 B2* | 3/2011 | Embach et al. | 74/552 |
| 2002/0011130 A1* | 1/2002 | Suzuki et al. | 74/552 |
| 2002/0033389 A1* | 3/2002 | Sugiyama et al. | 219/204 |
| 2002/0096012 A1* | 7/2002 | Hayashi et al. | 74/552 |
| 2003/0037633 A1* | 2/2003 | Grilli et al. | 74/552 |
| 2003/0089192 A1* | 5/2003 | Shimizu et al. | 74/552 |
| 2004/0007567 A1* | 1/2004 | Downey et al. | 219/494 |
| 2004/0237703 A1* | 12/2004 | Liuti et al. | 74/552 |
| 2009/0255367 A1* | 10/2009 | Tajiri | 74/552 |
| 2010/0071502 A1* | 3/2010 | Yasuda et al. | 74/552 |
| 2011/0073582 A1* | 3/2011 | Morita et al. | 219/204 |

FOREIGN PATENT DOCUMENTS

| | | | |
|---|---|---|---|
| JP | S61-196858 A | | 9/1986 |
| JP | S61-218475 A | | 9/1986 |
| JP | A-2004-520989 | | 7/2004 |
| JP | 2010076557 A | * | 4/2010 |
| JP | 2010-126016 A | | 6/2010 |
| JP | 2010126016 | * | 6/2010 |

* cited by examiner

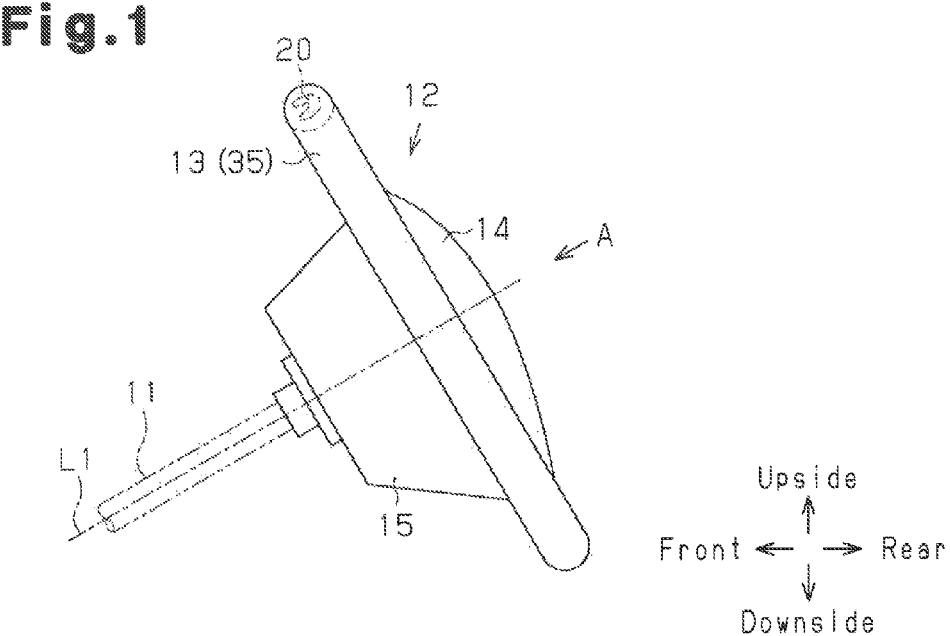
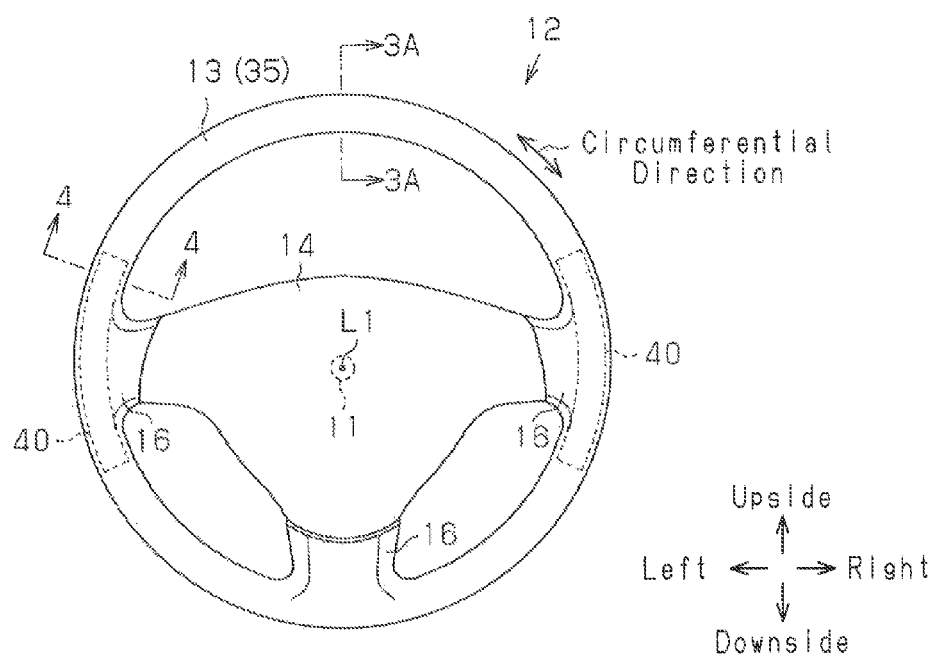

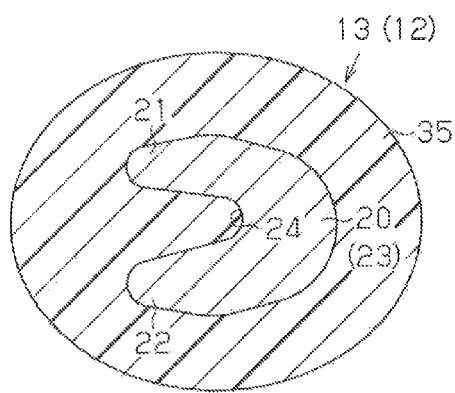
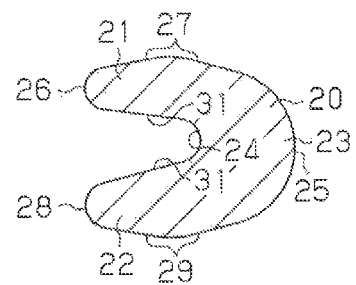
Fig.3A  Fig.3B
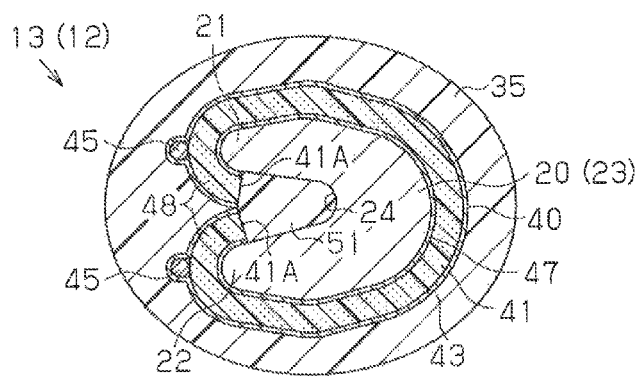
Fig.4
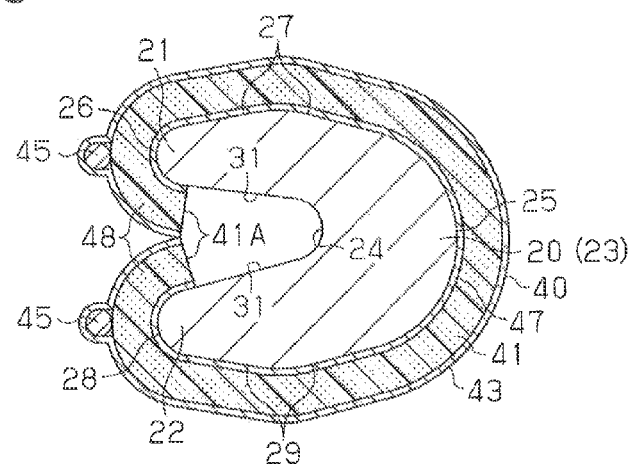
Fig.5

STEERING WHEEL

BACKGROUND OF THE INVENTION

The present invention relates to a steering wheel having a rim portion, in which heat generating members that generate heat when electrified are incorporated.

When a vehicle is parked in extremely cold weather in winter, the temperature in the passenger compartment is lowered. Accordingly, the temperature of the rim portion of the steering wheel is lowered. The rim portion is also referred to as the handle portion or ring portion. When the driver gets in the vehicle in this state and starts driving, he/she needs to grip the cold rim portion. This can make the steering operation uncomfortable.

In this regard, various types of steering wheels have been developed that have a rim portion in which heat generating members that generate heat when electrified are incorporated. For example, Japanese National Phase Laid-Open Patent Publication No. 2004-520989 discloses a steering wheel in which a rim metal core, which forms the framework of the rim portion, is coated with a base material made of urethane foam or neoprene. A sheet-like heat generating member, which is silver coated fabric, is attached to the rim metal core. The sheet-like heat generating member is coated with a foam material layer of polyurethane and a cover in that order.

In the steering wheel, since the base material hinders transfer of heat generated by the sheet-like heat generating member to the rim metal core, a greater amount of heat is transferred to the surface of the rim portion, which in turn efficiently increases the temperature of the rim portion surface. Also, since the heat generated by the sheet-like heat generating member is diffused by the silver coating layer, the rim portion surface is evenly heated.

In the steering wheel disclosed in Japanese National Phase Laid-Open Patent Publication No. 2004-520989, the base material and the foam material layer have a seamless cross-sectional structure. Although the base material has uneven thickness about the rim metal core, the cross-section of the base material has an elliptic shape. The base material and the foam material layer are each formed by molding plastic using molds.

However, to make the base material and the foam material layer through molding process, two molds are required, which increases costs.

SUMMARY OF THE INVENTION

Accordingly, it is an objective of the present invention to provide a steering wheel that reduces costs without degrading the heat generating performance.

To achieve the foregoing objective, and in accordance with one aspect of the present invention, a steering wheel having a rim portion is provided. The rim portion has an annular rim metal core, at least one heating element, and at least one layer of coating portion. The rim metal core forms a framework of the rim portion and has a surface. The heating element is arranged on a part in the circumference direction of the rim metal core and extends around the part of the rim metal core. The coating portion coats the heating element. The heating element includes a heat generating member, a heat transfer sheet, and a flexible heat insulating sheet. The heat generating member generates heat when electrified. The heat transfer sheet transfers heat of the heat generating member to the coating portion. The heat insulating sheet hinders heat of the heat generating member from being transferred to the rim metal core. The heat insulating sheet has a first sheet surface and a second sheet surface. The heat transfer sheet is laid on the first sheet surface of the heat insulating sheet. The heat generating member is located between the first sheet surface of the heat insulating sheet and the heat transfer sheet. The heating element has a flat shape as a whole, and is affixed to the rim metal core at the second sheet surface of the heat insulating sheet, while being flexed to conform to the surface of the rim metal core.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a side view illustrating a steering wheel according to one embodiment of the present invention;

FIG. 2 shows the steering wheel of FIG. 1 as viewed in the direction of arrow A;

FIG. 3A is an enlarged cross-sectional view taken along line 3A-3A of FIG. 2, illustrating the rim portion;

FIG. 3B is a cross-sectional view illustrating only the rim metal core in FIG. 3A;

FIG. 4 is an enlarged cross-sectional view taken along line 4-4 of FIG. 2, illustrating the rim portion;

FIG. 5 is a cross-sectional view of the embodiment of FIG. 1, illustrating a state in which a heating element is affixed to the rim metal core;

DETAILED DESCRIPTION OF THE PREFERRED EMBODIMENTS

Figure 6:
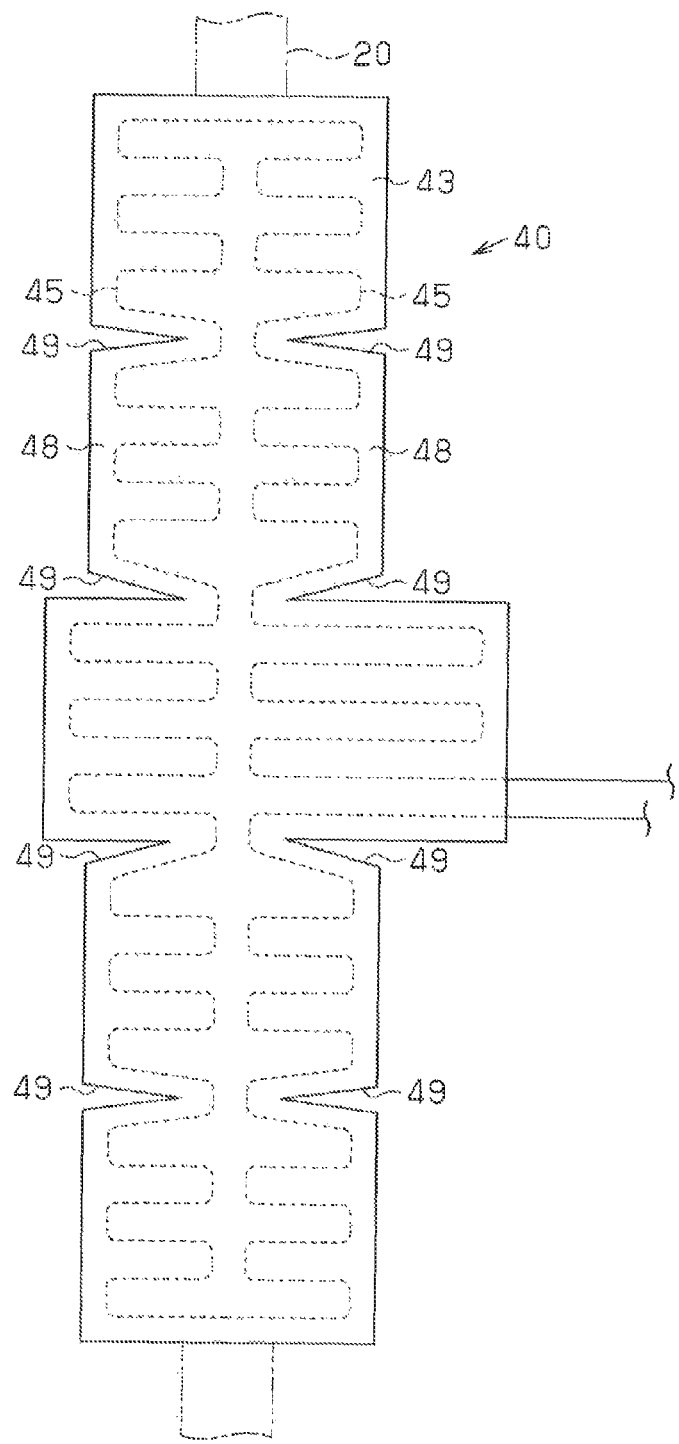
FIG. 6 is a plan view illustrating a flat heating element before being affixed to the rim metal core.
Figure 7:
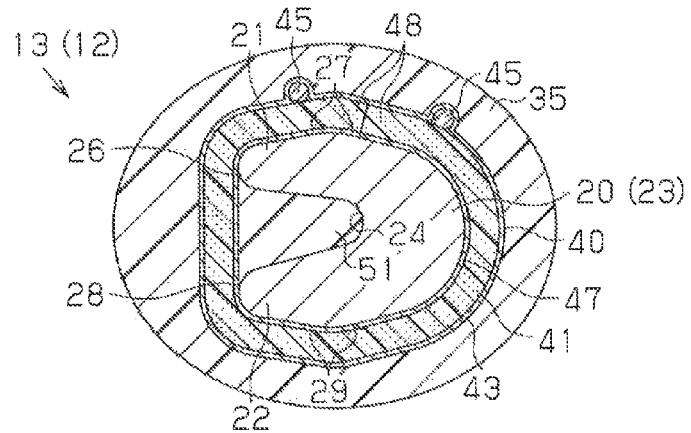
FIG. 7 is a cross-sectional view showing a rim portion of a steering wheel according to another embodiment.

A vehicle steering wheel according to one embodiment of the present invention will now be described with reference to FIGS. 1 to 6.

As shown in FIGS. 1 and 2, a steering shaft 11, which rotates about a rotation axis L1, is located, forward of a driver's seat of a vehicle (leftward of FIG. 1). The steering shaft 11 is inclined such that its height increases toward the driver's seat (toward the right side of FIG. 1). The rear end of the steering shaft 11 is coupled to a steering wheel 12 of the present embodiment. The steering wheel 12 is integrally rotational with the steering shaft 11.

The steering wheel 12 includes a rim portion 13, a pad portion 14, and spoke portions 16. The rim portion 13 is gripped by the driver when he/she performs steering operation. The rim portion 13 is formed to be substantially annular with its center coinciding with the rotation axis L1 (see FIG. 2).

The pad portion 14 is arranged in a space surrounded by the rim portion 13. The front side portion of the pad portion 14 is formed by a lower cover 15 (see FIG. 1). The spoke portions 16 (the number of which is three in the present embodiment) are located between the rim portion 13 and the pad portion 14.

To identify the circumferential positions in the rim portion 13, the upward, downward, leftward, and rightward directions are defined with reference to the state when the vehicle is traveling forward in a straight line (the neutral state).

FIG. 3A is a cross-sectional view taken along line 3A-3A of FIG. 2, illustrating the rim portion 13. FIG. 4 is a cross-sectional view taken along line 4-4 of FIG. 2, illustrating the rim portion 13. That is, FIG. 4 shows the cross-sectional structure of a left portion of the rim portion 13. The cross-sectional structure of a right portion of the rim portion 13 is identical to the cross-sectional structure in the left portion. Accordingly, a description for the cross-sectional structure in the right portion is omitted. In FIGS. 3A, 3E, and 4, the right side corresponds to the rear side in the vehicle (driver's seat), and the left side corresponds to the front side in the vehicle.

A metal core is arranged in each of the rim portion 13, the spoke portions 16, and the pad portion 14. The metal cores are formed, for example, of iron, aluminum, magnesium, or an alloy thereof. The metal cores include a rim metal core 20 located in the rim portion 13. The rim metal core 20 forms the framework of the rim portion 13 as shown in FIGS. 3A and 4, and substantially has an annular shape as viewed from the driver as shown in FIG. 2.

The rim metal core 20 is located inside of and separated from the surface of the rim portion 13. As shown in FIG. 3B, the rim metal core 20 includes an outer annular portion 21, an inner annular portion 22, and a coupling annular portion 23, which couples the rear end of the outer annular portion 21 and the rear end of the inner annular portion 22 to each other. The outer annular portion 21 is formed to be annular with its center coinciding with the rotation axis L1. The inner annular portion 22 is formed to be annular with its center coinciding with the rotation axis L1. The diameter of the inner annular portion 22 is slightly smaller than the diameter of the outer annular portion 21. The coupling annular portion 23 is formed to be annular with its center coinciding with the rotation axis L1. The outer annular portion 21, the inner annular portion 22, and the coupling annular portion 23 define a groove 24, which opens in the front surface of the rim metal core 20. The groove 24 substantially extends along the entire circumference of the rim portion 13. The rim metal core 20 therefore substantially has a U-shaped cross-sectional shape.

The coupling annular portion 23 has a first curved surface section 25, which is curved to bulge rearward. The outer annular portion 21 has a second curved surface section 26, which is curved to bulge forward. The outer annular portion 21 has two first flat surface sections 27, which are located between the second curved surface section 26 of the outer annular portion 21 and the first curved surface section. 25 of the coupling annular portion 23. The inner annular portion 22 has a third curved surface section 28, which is curved to bulge forward. The inner annular portion 22 has two second flat surface sections 29, which are located between the third curved surface section 28 of the inner annular portion 22 and the first curved surface section 25 of the coupling annular portion. 23. Also, the inner wall of the groove 24 includes a pair of third flat surface sections 31 facing each other.

In parts of the rim portion 13 in the circumferential direction (parts at which heating elements 40, which will be discussed below, are not provided), the rim metal core 20 is coated only by a coating portion 35 as illustrated in FIG. 3A. The coating portion 35 is formed through molding urethane plastic. The surface of the coating portion 35 is smooth and has few asperities and serves as the ornamental surface of the rim portion 13.

As shown by broken lines in FIG. 2, the heating elements 40 are installed in left side and right side parts of the rim portion 13, which are gripped by a number of drivers, in the circumferential direction. As shown in FIGS. 4 and 5, each heating element 40 includes a heat insulating sheet 41, a heat transfer sheet 43, a heat generating member 45, and an adherent layer 47. Each heating element 40 is located between the rim metal core 20 and the coating portion 35.

Each heat insulating sheet 41 is a plate made of a flexible heat insulating material and has a uniform thickness (2 to 3 mm in the present embodiment). The heat insulating sheets 41 each have a first sheet surface and a second sheet surface. The heat insulating sheets 41 function as heat insulating portions. As the heat insulating material, elastic and soft material such as urethane and rubber are suitable. Particularly, to improve the heat insulation property, the heat insulating sheets 41 are preferably made of a foam material. Further, the heat insulating sheets 41 are preferably made of a plastic material that is compatible with the coating portion 35. The compatibility is satisfactory between the same or similar materials. A urethane foam is used as a plastic material for the heat insulating sheets 41 that meet these conditions in the present embodiment.

The heat transfer sheets 43 rapidly diffuse heat generated by the heat generating members 45. The heat transfer sheets 43 are thinner than the heat insulating sheets 41 and are made of a material having a high thermal conductivity. The heat transfer sheets 43 are bent along the rim metal core 20 like the heat insulating sheets 41. Accordingly, the heat transfer sheets 43 are preferably thin. In the present embodiment, the heat transfer sheets 43 are made of aluminum foil. Each heat transfer sheets 43 is laid on the first sheet surface of the corresponding heat insulating sheet 41 and is fixed to the heat insulating sheet 41 by fixing means such as adhesion. The heat transfer sheet 43 function as a heat transfer portion.

Each heat generating member 45 is located between the heat insulating sheet 41 and the heat transfer sheet 43. The heat generating members 45 generate heat when electrified. For example, the heat generating members 45 are made of wires that have a relatively great electrical resistance and generate heat when electrified (electrical heating wire). As shown in FIG. 6, the heat generating member (electrical heating wire) 45 is arranged in the longitudinal direction of the heating element 40 (the vertical direction as viewed in FIG. 6), and is repeatedly bent to form undulations.

As shown in FIGS. 4 and 5, the adherent layer 47 is laid on the entire second sheet surface of each heat insulating sheet 41 and has a uniform thickness.

When spread, each heating element 40 has an elongated shape as shown in FIG. 6. The heating element 40 has a pair of opposed edges 48, which face each other and extend in the longitudinal direction. The heat insulating sheet 41 and the heat transfer sheet 43 of the heating element 40 have cutouts 49, each of which extends from a position in one of the opposed edges 48 toward the other opposed edge 48. The width of each cutout 49 is reduced as the distance from the corresponding opposed edge 48 increases.

The heat transfer sheets 43 and the adherent layers 47 are not formed on end faces 41A of the heat insulating sheets 41 on the opposed edges 48 of the heating element 40, so that the end faces 41A are exposed.

As shown in FIGS. 4 and 5, each heating element 40 is arranged such that the opposed edges 48 are located at the entrance of the groove 24. The heating element 40 is bent along the outer shape of the rim metal core 20 and affixed to the rim metal core 20 by the adherent layer 47. The end faces 41A of the heat insulating sheet 41 on the opposed edges 48 are located in the groove 24. One of the opposed edges 48 (the upper one as viewed in FIGS. 4 and 5) is affixed to the second curved surface section 26 of the outer annular portion 21, and the other opposed edge 48 (the lower one as viewed in FIGS. 4 and 5) is affixed to the third curved surface section 28 of the inner annular portion 22. The opposed edges 48 are close to each other or contact each other at the entrance of the groove 24. The entrance of the groove 24 is completely or almost blocked by the opposed edges 48.

Further, as shown in FIG. 4, a filling portion 51 fills the interior of the groove 24 of the rim metal core 20 to contact the end faces 41A of each heat insulating sheet 41. The filling portion 51 and the coating portion 35 are made of plastic (polyurethane in the present embodiment) that has compatibility with the heat insulating sheet 41. The filling portion 51 and the coating portion 35 are formed to be coupled to each other through molding of plastic.

The rim portion 13 is configured as described above. When manufacturing the rim portion 13, each heating element 40 shown in FIG. 6 is bent along the outer shape of the rim metal core 20 such that the opposed edges 48 are at the entrance of the groove 24. That is, the heating element 40 is bent along the curved surface section 26 and the flat surface sections 27 of the outer annular portion 21, the curved surface section 25 of the coupling annular portion 23, and the second flat surface sections 29 and the third curved surface section 28 of the inner annular portion 22, such that the opposed edges 48 are located at the entrance of the groove 24 as shown in FIG. 5. The adherent layer 47 located on the second sheet surface of the heat insulating sheet 41 is adhered to the rim metal core 20. At this time, one of the opposed edges 48 (the upper one as viewed in FIG. 5) is attached to the second curved surface section 26 of the outer annular portion 21, the other opposed edge 48 (the lower one as viewed in FIG. is attached to the third curved surface section 28 of the inner annular portion 22. Through the attachment, the heating element 40 is affixed to the rim metal core 20 via the adherent layer 47. Also, the opposed edges 48 are close to each other or contact each other at the entrance of the groove 24. Accordingly, the entrance is completely or almost blocked by the opposed edges 48.

The rim metal core 20 has an annular shape as viewed in the direction of arrow A in FIG. 1. The rim metal core 20 includes the outer annular portion 21, the inner annular portion 22, and the coupling annular portion 23 and has a U-shaped cross section (see FIG. 3B). The rim metal core 20 thus has a three-dimensional curved surface. In contrast, before being affixed to the rim metal core 20, each heating element 40 has a flat shape (see FIG. 6). In the components of the heating element 40, the heat transfer sheet 43 is less stretchable than the heat insulating sheet 41. Therefore, when the heating element 40 is affixed to the rim metal core 20, some parts of the heating element 40 might be redundant and not contribute to affixation, and wrinkles may be formed in these parts. In this respect, according to the present embodiment, the heat insulating sheet 41 and the heat transfer sheet 43 of the heating element 40 have cutouts 49 at multiple positions, which reduces such redundant parts. Accordingly, when affixed to the rim metal core 20, the heating element 40 is prevented forming wrinkles.

The heat generating member 45 is arranged in the longitudinal direction of the heating element 40, and is repeatedly bent to form undulations (see FIG. 6). Therefore, when the heating element 40 is bent along the rim metal core 20, the heat generating member 45 easily conforms to the outer shape of the rim metal core 20, which facilitates affixation of the heating element 40 to the rim metal core 20.

When affixed to the rim metal core 20, the heat insulating sheets 41 are bent but not stretched or contracted. Therefore, each heat insulating sheet 41 has a uniform thickness when affixed (see FIG. 5).

The affixation of the heating elements 40 forms the heat insulating sheets 41, which function as heat insulating portions, the heat generating members 45, and the heat transfer sheets 43, which function as heat transfer portion, about the rim metal core 20. Therefore, unlike Japanese National Phase Laid-Open Patent Publication No. 2004-520989, a heat insulating portion does not need to be formed about the rim metal core 20 through molding. Further, the adherent layers 47 are prepared in advance as part of the heating elements 40. Therefore, when affixing each heating element 40, the adherent layer 47 does not need to be provided to at least one of the rim metal core 20 and the heat insulating sheet 41.

Further, the rim metal core 20, to which the heating elements 40 are affixed, is placed in a mold (not shown) as an insert. Then, molten plastic material is supplied to the mold, and molding is performed. At this time, a great amount of molten plastic material is supplied to the space around each heating element 40. The supplied plastic material is then set so that the coating portion 35 is formed about the heating element 40 (see FIG. 4). Some of the molten plastic material fills the groove 24 of the rim metal core 20 (see FIG. 4). The plastic material filling the groove 24 is set to form, in the groove 24, the filling portion 51, which contacts the end faces 41A of the heat insulating sheet 41 and is coupled to the coating portion 35.

The coating portion 35 and the filling portions 51 are made of a plastic material that is the same type (in the present embodiment, urethane) as the heat insulating sheets 41 and has compatibility with the heat insulating sheets 41. Therefore, each filling portion 51 is integrally attached to the corresponding heat insulating sheet 41. In other words, the coating portion 35 is attached to the heat insulating sheet 41 via the filling portion 51.

If the surface of the rim portion 13, that is, the ornamental surface has asperities due to asperities on the surface of the heating elements 40, the external appearance will be degraded. However, the coating portion 35 provided about the heating elements 40 is made of plastic through molding. Therefore, the surface of the rim portion 13 is not easily influenced by asperities on the surfaces of the heating elements 40, and is smooth or almost smooth.

Operation of the steering wheel 12 according to the present embodiment having the rim portion 13, which has been manufactured in the above described manner, will now be described.

When the vehicle starts being driven in the winter under a low outside temperature condition and the temperature of the rim portion 13 is low, the heat generating members 45 of the heating elements 40 are electrified and generate heat. The heat generated by the heat generating members 45 is diffused by the heat transfer sheets 43, which functions as a heat transfer portion, and is transferred to the coating portion 35. The heat transfer allows the coating portion 35 to be quickly heated in a uniform temperature distribution. This heats large parts of the surface of the rim portion 13 that correspond to the heat generating members 45.

Also, the heat insulating sheets 41 of the rim portion 13 have a uniform thickness (see FIG. 4). Thus, the distance from each heat generating member 45 to the surface of the rim portion 13 does not vary significantly. This property is also advantages in making the temperature distribution of the coating portion 35 uniform.

The rim metal core 20 is made of any of the above listed metals and has good heat conductivity. Thus, if each heat generating member 45 directly contacts the corresponding rim metal core 20, the heat generated by the heat generating member 45 is easily transferred to the rim metal core 20. If heat is transferred to the rim metal core 20, the amount of heat transferred from the heat generating member 45 to the surface of the rim portion 13, that is, to the surface of the coating portion 35 is reduced accordingly.

However, in the present embodiment, the heat insulating sheets 41, which have a predetermined thickness, are located between the rim metal core 20 and the heat generating members 45, and the heat insulating sheets 41 function as heat insulating portions. The predetermined thickness of the heat insulating sheets 41 is a thickness necessary for hindering heat generated by the heat generating members 45 from being transferred to the rim metal core 20. The heat insulating sheets 41 are formed of a foam material with a great number of pores inside. Air in the pores insulates heat. Therefore, the phenomenon in which the heat generated by the heat generating members 45 is transferred to the rim metal core 20 is suppressed by the heat insulating sheets 41. As a result, a greater amount of the heat generated by the heat generating members 45 is transferred to the coating portion 35, so that the coating portion 35 is efficiently heated.

In the steering wheel 12 of the present embodiment, the coating portion 35 about each heating element 40 and the filling portion 51 in the groove 24 of the rim metal core 20 are coupled to each other. Therefore, when the driver performs steering operation while gripping the rim portion 13, the filling portions 51 prevent the coating portion 35 from coming off the heating elements 40. The filling portions 51 are made of a plastic material that is compatible with the heat insulating sheets 41. The filling portions 51 are integrally attached to the end faces 41A of the heat insulating sheets 41. This increases the peel strength of the filling portions 51 with respect to the heat insulating sheets 41. The coating portion 35 is attached to the heat insulating sheets 41 via the filling portions 51. This further prevents the coating portion 35 from peeling off the heating elements 40.

The present embodiment, which is described above, has the following advantages.

(1) The rim portion 13 includes the rim metal core 20, the heating elements 40, and the coating portion 35. Each heating element 40 includes the flexible heat insulating sheet 41, which has a first sheet surface and a second sheet surface, the heat transfer sheet 43, which is laid on the first sheet surface of the heat insulating sheet 41, the heat generating member 45, which is located between the first sheet surface of the heat insulating sheet 41 and the heat transfer sheet 43, and generates heat when electrified. The heating element 40 has a flat shape as a whole. The heating element 40 is affixed to the rim metal core 20 at the second sheet surface of the heat insulating sheet 41 (FIG. 4).

Therefore, the heat insulating sheets 41 and the heat transfer sheets 43 function to transfer a greater amount of heat generated by the heat generating members 45 of the heating elements 40 to a large portion of the coating portion 35 that corresponds to the heat generating members 45. This efficiently heats the surface of the rim portion 13.

Each heating element 40 includes the heat insulating sheet 41, which functions as a heat insulating portion. This eliminates the necessity for forming a heat insulating portion about the rim metal core 20 through molding. Accordingly, a mold for molding a heat insulating portion is unnecessary. This reduces cots.

in each heating element 40, the heat insulating sheet 41, the heat generating member 45, and the heat transfer sheet 43 are formed integrally. Therefore, the heat insulating sheet 41, the heat generating member 45, and the heat transfer sheet 43 can be simultaneously arranged about the rim metal core 20 simply by affixing the heating element 40 to the rim metal core 20. This reduces the number of manufacturing steps.

(2) The heating element 40 has the adherent layer 47 on the second sheet surface of the heat insulating sheet 41. The heating element 40 is affixed to the rim metal core 20 at the adherent layer 47 (FIG. 4).

Therefore, when affixing each heating element 40, the adherent layer 47 does not need to be provided on the rim metal core 20 or the heat insulating sheet 41. This facilitates affixation of the heating element 40 to the rim metal core 20.

(3) Each heating element 40 has the cutouts 49, which are formed in the heat insulating sheet 41 and the heat transfer sheet 43 (FIG. 6).

Therefore, wrinkles that are formed when the heating element 40 is affixed to the rim metal core 20 are reduced.

(4) The coating portion 35 is formed about each heating element 40 through molding of plastic (FIG. 4).

Therefore, asperities on the surface of the heating elements 40 do not cause asperities on the ornamental surface of the rim portion 13. This prevents the external appearance from being degraded by asperities of the surface of the heating elements 40.

(5) The rim metal core 20 has the groove 24. The filling portions 51, which contact the end faces 41A of the insulating sheets 41, are provided in the groove 24. Further, the coating portion 35 and the filling portions 51 are made of plastic that is compatible with the heat insulating sheets 41 and, are coupled to each other through molding (FIG. 4).

This improves the peel strength of the coating portion 35 with respect to the heating elements 40. When the driver grips the rim portion 13 to perform steering operation, the coating portion 35 is prevented from peeling off the heating elements 40.

The present invention may be modified as follows.

<Regarding Rim Metal Core 20>

The rim metal core 20 may have a cross-sectional structure different from that described in the above embodiment. For example, the rim metal core 20 may have a cross-sectional shape without the groove 24. Alternatively, the rim metal core 20 may have a cross-sectional shape with two or more grooves 24.

<Regarding Positions of Heating Elements 40>

The positions of the heating elements 40 in the rim portion 13 may be changed as long as they are located at least at positions that are frequently gripped by the driver.

The heating element 40 may be provided over the entire circumference of the rim portion 13.

<Regarding Affixation of Heating Elements 40>

Each heat insulating sheet 41 has elastic restoring force so that it acts to return to the original shape when flexed. Therefore, the opposed edges 48 of each heating element 40 might peel of if affixed to the curved surface section of the rim metal core 20, for example, the second curved surface section 26 of the outer annular portion 21 or the third curved surface section 28 of the inner annular portion 22.

Accordingly, as shown in FIG.1, if the rim metal core 20 has two first flat surface sections 27 on the outer annular portion 21 and two flat surface sections 29 on the inner annular portion 22 as in the above described embodiment, the opposed edges 48 of each heating element 40 may be affixed to the first (or second) flat surface sections 27 (or 29) while being placed dose to each other. In this case, the opposed edges 48, which are affixed to the first (or second) flat surface sections 27 (or 29) are not flexed as much as in the case in which the opposed edges 48 are affixed to the second curved surface sections 26, 28. Therefore, the elastic restoring force of the opposed edges 48 that are affixed to the first (or second) flat surface sections 27 (or 29) is weaker than that in the case in which they are affixed to the second and third curved surface sections 26, 28. The opposed edges 48 therefore cannot be easily peeled off the rim metal core 20.

Figure 8:
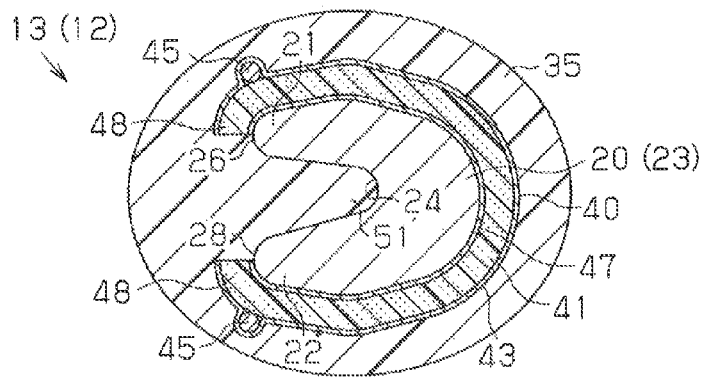
FIG. 8 is a cross-sectional view showing a rim portion of a steering wheel according to another embodiment.

When the opposed edges 48 of each heating element 40 are affixed to the second and third curved surface sections 26, 28 of the rim metal core 20, the smaller the area of affixation, the less easily peeling occurs. Accordingly, for example, as shown in FIG. 8, one of the opposed edges 48 (the upper one as viewed in FIG. 8) of each heating element 40 may be affixed to only part of the second curved surface section 26 of the outer annular portion 21. Also, the other opposed edge 48 (the lower one as viewed in FIG. 8) may be affixed to only part of the third curved surface section 28 of the inner annular portion 22.

Figure 9:
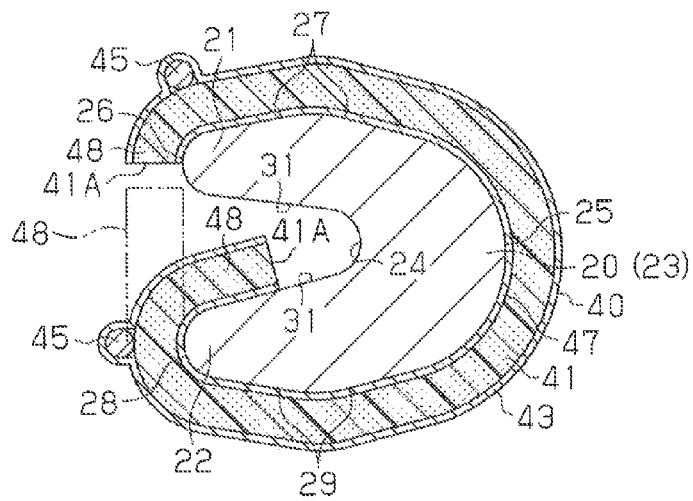
FIG. 9 is a cross-sectional view of a steering wheel according to another embodiment, illustrating a state in which a heating element is affixed to the rim metal core.
Figure 10:
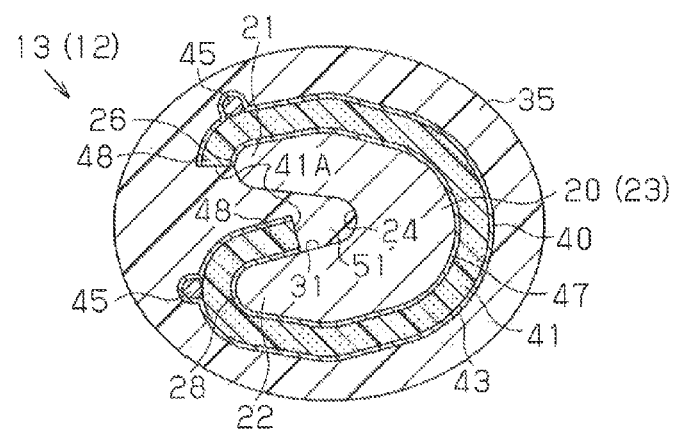
FIG. 10 is a cross-sectional view showing a rim portion in which a coating portion is provided about the heating element shown in FIG. 9.

Further, if the inner wall surface of the groove 24 of the rim metal core 20 has a pair of opposed third flat surface sections 31 as in the above described embodiment, at least one of the opposed edges 48 may be affixed to the corresponding third flat surface section 31 in the groove 24. FIGS. 9 and 10 illustrate an example in which only one of the opposed edges 48 (the lower one as viewed in the drawings) is affixed to the corresponding on e of the third fiat surface sections 31 in the groove 24. in this case, one of the opposed edges 48 is bent along the third curved surface section 28 as indicated by a line formed by a long dash alternating with two short dashes in FIG. 9, and is then inserted into the groove 24 to be affixed to the third flat surface section 31, The opposed edge 48 of each heating element 40 that is affixed to the corresponding third flat surface section 31 is less flexed than a part of the heating element 40 that is bent along the third curved surface section 28 and therefore has less elastic restoring force. Thus, the opposed edge 48 cannot be easily peeled off the rim metal core 20. The longer the parts of each heating element 40 that are inserted into the groove 24 are, that is, the larger the affixation area with the third flat surface sections 31, the more the opposed edges 48 resist peeling, or separation.

However, it is difficult to cause both opposed edges 48 enter deep into the groove 24 and to affix the opposed edges 48 to the flat surface sections 31 on the inner wall. This is because, when the opposed edges 48 are caused to sequentially enter the groove 24, the adherent layer 47 of one of the opposed edges 48 that enters the groove 24 later can adhere to the other opposed edge 48, which has already been affixed to the flat surface section 31, and this makes it difficult for the later inserted opposed edge 48 to enter the groove 24.

In this ease, for example, as shown in FIG. 9, one of the opposed edges 48 (the upper one as viewed in FIG. 9) may be affixed to a part of the second curved surface section 26 while being kept from entering the groove 24.

<Regarding Heat Insulating Sheets 41>

The heat insulating sheets 41 may be made of a material other than a foam material, <Regarding Heat Transfer Sheets 43>

The heat transfer sheets 43 do need to be made of aluminum foil, but may be made of any material that is capable of diffusing heat generated, by the heat generating members 45. For example, the heat transfer sheets 43 may be made of copper foil.

<Regarding Heat Generating Members 45>

The heat generating members 45 do not need to be electrical heating wires as described above, but may be other heating elements that generate heat when electrified. For example, insulation sheets with a resistor layer formed thereon may be used as the heat generating members 45.

Each heat generating members 45 may be located between the heat insulating sheet 41 and the heat transfer sheet 43 in a manner different from that in the above described embodiment. For example, each heat generating member 45 may be arranged along the transverse direction of the heating element 40 and repeatedly bent to form undulations.

<Regarding Adherent Layers 47>

The adherent layers 47 may be omitted from the heating elements 40. In this case, the heating elements 40 may be affixed to the rim metal core 20, for example, with adhesive.

<Regarding Cutouts 49>

The cutouts 49 may have a shape different from that in the above described embodiment.

At least either the positions or the number of the cutouts 49 in the longitudinal direction of the heating elements 40 may be changed.

Some of the cutouts 49 may be formed to extend in a direction orthogonal to the other cutouts 49 (in the vertical direction as viewed in FIG. 6).

<Regarding Filling Portions 51>

Figure 11:
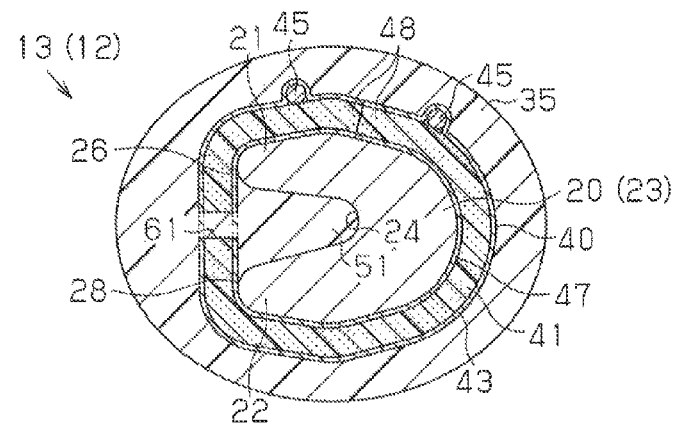
FIG. 11 is a cross-sectional view showing a rim portion of a steering wheel according to another embodiment.

If the entrance of the groove 24 is blocked by each heating element 40 as shown in FIG. 11, a hole 61 may be formed in the blocking portion, so that the coating portion 35 and the filling portion 51 are coupled to each other via the hole 61. This improves the coupling strength of the coating portion 35 and the filling portions 51. When the driver grips the rim portion 13 to perform steering operation, the coating portion 35 is further reliably prevented from peeling off the heating elements 40.

<Regarding Coating Portion 35>

Figure 12:
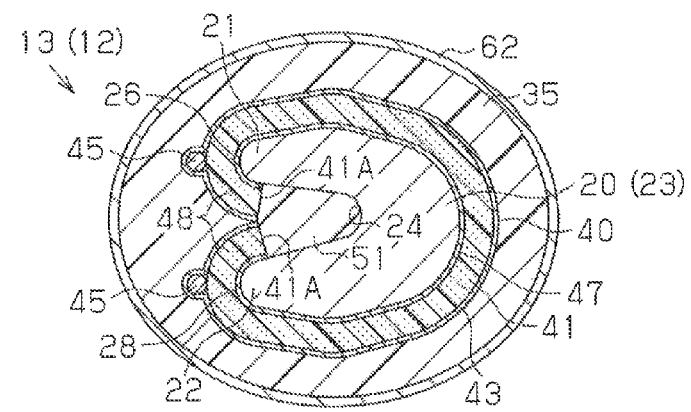
FIG. 12 is a cross-sectional view showing a rim portion of a steering wheel according to another embodiment.

As shown in FIG. 12, an additional coating portion 62 may be provided about the coating portion 35, which coats the heating elements 40. The additional coating portion 62 may be a cover made, for example, of leather. The same modification may be applied to the steering wheels 12 illustrated in FIGS. 7, 8, 10 and 11.

When a cover is directly wrapped around the heating element 40, asperities on the surface of the heating element 40 are likely to form asperities on the surface of the cover (the ornamental surface of the rim portion 13). However, according to the modification of FIG. 12, the additional coating portion 62 is provided about the coating portion 35, which coats the heating elements 40. This is less likely to form asperities on the cover, so that the heating elements 40 are less likely to degrade the external appearance of the steering wheel 12.

When the influence of the external shape of the heating elements 40 on the ornamental surface of the rim portion 13 is small or when small amount of asperities on the ornamental surface can be disregarded, leather may be directly wrapped about the heating element 40, instead of about the coating portion 35. In this case, the leather functions as a coating portion.

<Others>

The "vehicle" in the present description is not limited to private automobiles and various industrial vehicles, but may be any type of transportations that carry personnel. For example, aircrafts and ships are included in the vehicles in the present description.

Therefore, the present examples and embodiments are to be considered as illustrative and not restrictive and the invention is not to be limited to the details given herein, but may be modified within the scope and equivalence of the appended claims.

The invention claimed is:

1. A steering wheel comprising a rim portion, wherein the rim portion includes:
an annular rim metal core, which forms a framework of the rim portion and has a surface;
at least one heating element, which is arranged on a part in the circumference direction of the rim metal core and extends around the part of the rim metal core; and
at least one layer of coating portion, which coats the heating element,
the heating element includes:
a heat generating member, which generates heat when electrified;
a heat transfer sheet, which transfers heat of the heat generating member to the coating portion; and
a flexible heat insulating sheet, which hinders heat of the heat generating member from being transferred to the rim metal core,
the heat insulating sheet has a first sheet surface and a second sheet surface,
the heat generating member is arranged on the first sheet surface of the heat insulating sheet,
the heat transfer sheet is laid on the heat generating member and exposed surfaces of the first sheet surface of the heat insulating sheet not covered by the heat generating member,
the heating element has a flat shape, which is affixed to the rim metal core at the second sheet surface of the heat insulating sheet, while being flexed to conform to the surface of the rim metal core,
the rim metal core has a groove,
a filling portion, which contacts the heat insulating sheet, fills the groove, and
the coating portion and the filling portion are formed to be coupled to each other by molding plastic that has compatibility with the heat insulating sheet.

2. The steering wheel according to claim 1, wherein the heating element includes an adherent layer on the second sheet surface of the heat insulating sheet, and the heating element is affixed to the rim metal core at the adherent layer.

3. The steering wheel according to claim 1, wherein the heating element includes a plurality of cutouts, which are formed in the heat insulating sheet and the heat transfer sheet.

4. The steering wheel according to claim 1, wherein the coating portion is formed by molding plastic.

5. The steering wheel according to claim 1, wherein the rim metal core has a groove,
the groove includes an inner wall, which has a pair of opposed flat surface sections,
the heating element includes a pair of opposed edges facing each other, and
at least one of the opposed edges is located in the groove and is affixed to a corresponding one of the flat surface sections of the groove.

6. The steering wheel according to claim 1, wherein the surface of the rim metal core includes a flat surface section,
the heating element includes a pair of opposed edges facing each other, and
the opposed edges are affixed to the flat surface section of the surface of the rim metal core such that the opposed edges approach each other.

7. A steering wheel comprising a rim portion, wherein the rim portion includes:
an annular rim metal core, which forms a framework of the rim portion and has a surface;
at least one heating element, which is arranged on a part in the circumference direction of the rim metal core and extends around the part of the rim metal core; and
at least one layer of coating portion, which coats the heating element,
the heating element includes:
a heat generating member, which generates heat when electrified;
a heat transfer sheet, which transfers heat of the heat generating member to the coating portion; and
a flexible heat insulating sheet, which hinders heat of the heat generating member from being transferred to the rim metal core,
the heat insulating sheet has a first sheet surface and a second sheet surface,
the heat generating member is arranged on the first sheet surface of the heat insulating sheet,
the heat transfer sheet is laid on the heat generating heat insulating sheet and exposed surfaces of the first sheet surface of the heat insulating sheet not covered by the heat generating member
the heating element has a flat shape and is affixed to the rim metal core at the second sheet surface of the heat insulating sheet, while being flexed to conform to the surface of the rim metal core, and
the heat insulating sheet, the heat generating member and the heat transfer sheet are formed integrally.

* * * * *